Figure 1:
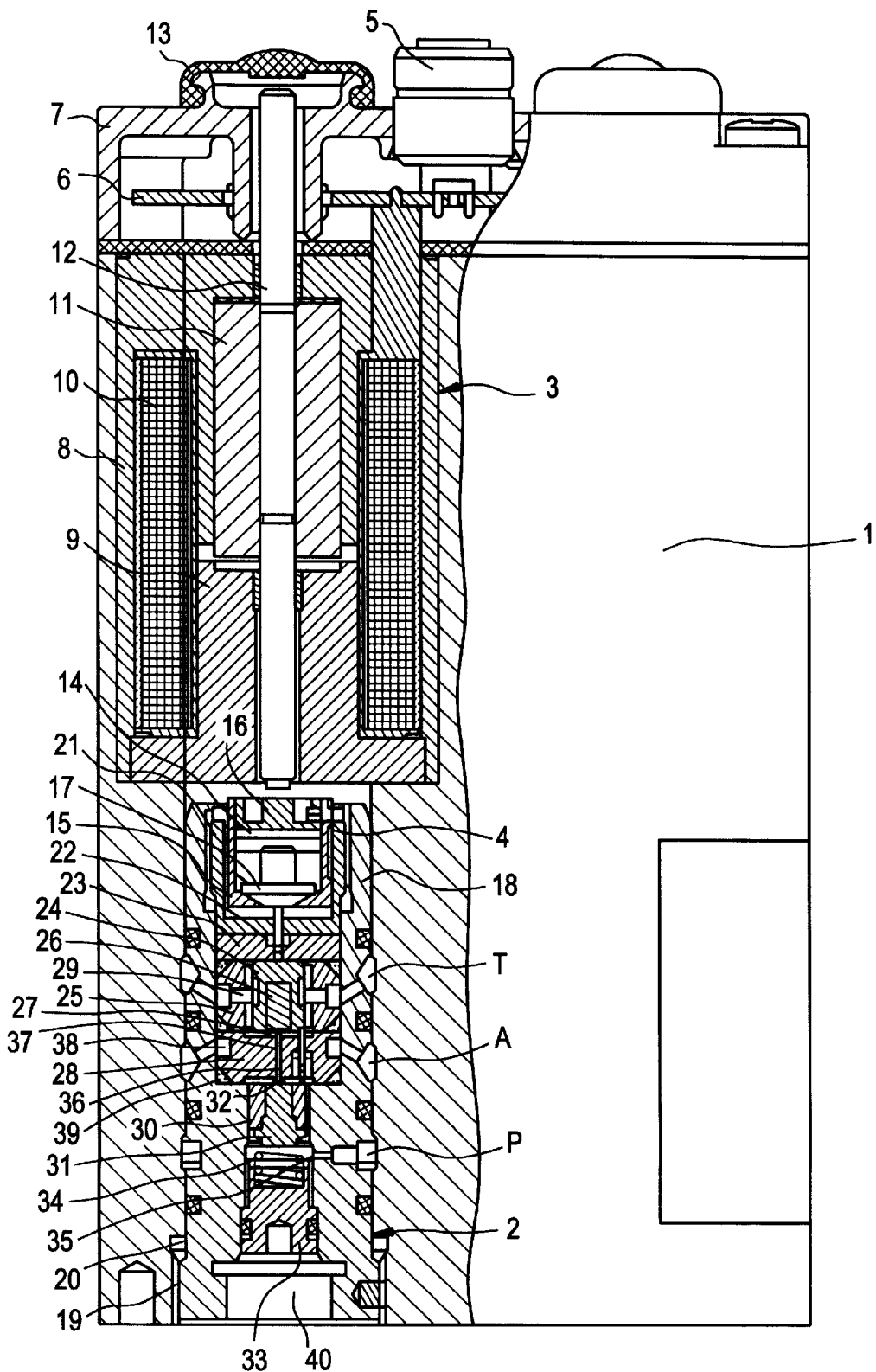

United States Patent
Kobow et al.

[11] Patent Number: 6,098,653
[45] Date of Patent: Aug. 8, 2000

[54] ELECTROHYDRAULIC CONTROL VALVE

[75] Inventors: Wolfgang Kobow, Wuppertal; Werner Reinelt, Bochum, both of Germany

[73] Assignee: DBT Automation GmbH, Essen, Germany

[21] Appl. No.: 09/171,938

[22] PCT Filed: Nov. 7, 1997

[86] PCT No.: PCT/DE97/02630

§ 371 Date: Oct. 28, 1998

§ 102(e) Date: Oct. 28, 1998

[87] PCT Pub. No.: WO98/21511

PCT Pub. Date: May 22, 1998

[30] Foreign Application Priority Data

Nov. 12, 1996 [DE] Germany .............................. 196 46 611

[51] Int. Cl.[7] .......................... F15B 13/044; F16K 31/10
[52] U.S. Cl. ............................. 137/454.5; 137/596.17; 251/129.18; 251/129.19
[58] Field of Search ................ 137/596.17, 454.5; 251/129.19, 129.18

[56] References Cited

U.S. PATENT DOCUMENTS 5,427,142  6/1995  Peters et al. ...................... 137/596.17

FOREIGN PATENT DOCUMENTS

| 629 782 | 12/1994 | European Pat. Off. . |
| 2 461 868 | 2/1981 | France . |
| 32 06 555 | 9/1983 | Germany . |
| 36 21 559 | 1/1988 | Germany . |
| 37 17 403 | 12/1988 | Germany . |
| 41 22 982 | 1/1993 | Germany . |
| 41 26 053 | 2/1993 | Germany . |

*Primary Examiner*—Gerald A. Michalsky
*Attorney, Agent, or Firm*—Vickers, Daniels & Young

[57] ABSTRACT

The electrohydraulic control unit comprises at least one 3/2 directional control valve 2 which is switched by an electromagnet 3 connected to an intrinsically safe power supply. The components of the 3/2 directional control valve 2 are arranged in a valve cartridge 18 inserted into the valve casing 1 on a common axis and with adjustable clearance with respect to the electromagnet 3. The control plunger 12 of the electromagnet 3 transmits the switching force through a precompressed spring buffer 4 to the stoppers 24, 30 of the 3/2 directional control valve 2.

9 Claims, 1 Drawing Sheet

ELECTROHYDRAULIC CONTROL VALVE

DESCRIPTION

The invention relates to an electrohydraulic control unit for a hydraulic self-advancing support with a 3/2 directional control valve connectable to a high-pressure line and with an electromagnet connectable to an intrinsically safe power supply to operate a stopper which in the closing position is held on a sealed seat by a closing spring and by the hydraulic fluid and is shiftable to the opening position by the control plunger of the electromagnet, a spring buffer with a pressure element which is subjected to initial pressure by spring force being arranged between the control plunger and the stopper.

A switching device for a hydraulic directional control valve which can be precisely set for specified switching force and travel is known from DE 3717403 C1. This switching device is being successfully used in underground mining for controlling hydraulic self-advancing supports. The operation of these supports involves high supporting forces, generated by jacks working at high pressures. The control valves are switched by electromagnets, which are connected to intrinsically safe power supplies for safety reasons. Converting the inherently small switching forces which can be obtained with electromagnets in the intrinsically safe range to the high pressure of the hydraulic fluid present in the valves makes it necessary for the valves to respond and operate very precisely under the specified conditions.

To transmit the switching force produced by the pulse generator (the electromagnet) to the hydraulic directional control valve, this switching device uses a double-armed lever mounted in the manner of a balance beam, with lever arms of equal length on either side. On the directional control valve side, the lever arm is fitted with a spring buffer with a pressure element which is urged in the opposite direction to the direction of operation and is guided in an axially displaceable manner in a bush displaceable in the direction of operation. The spring buffer imparts to the switch pin of the directional control valve a specified switching force whose magnitude can be altered by the initial compression of the spring. The spring buffer is fitted, with the bush, in a tapped hole in the lever, and is adjustable in the direction of operation with respect to the directional control valve, which is fixed in the valve casing, so that the necessary switching travel can be precisely defined. Careful adjustment in the direction of operation is imperative, as the switching behaviour of the valve is affected considerably by the play due to the manufacturing tolerances of the individual components of the valve on the one hand and by the play present in the electromagnet on the other hand. The switching force of the electromagnet increases disproportionately as the switching travel increases. Consequently the valve has to be switched in the upper range of switching force. If the switching travel is set too tightly, with too little play, the force is insufficient to open the valve, as full switching force is not attained. If there is too much play, the control plunger of the electromagnet, connected to the armature, travels to the end position without switching the valve.

The aforesaid switching arrangement is in need of improvement. The construction necessary for transmitting the switching forces and for accommodating an adjustable spring buffer in a two-armed lever is complex, and therefore costly. Adjustment and replacement of components are time-consuming.

DE 4122982 C2 describes a switching device in which an electromagnet and a 2/2 spool valve are arranged one behind the other on a common axis, with the valve spool resting against the control plunger of the magnet. The valve body is screwed to the casing of the electromagnet with adjustable clearance so that the lap between the spool and a control bore in the valve body can be varied, thus allowing adjustment of the effective orifice for pressure regulation. This variation has no effect on the switching force which is exerted by the electromagnet on the valve.

The problem which the present invention sets out to solve is that of constructing an electrohydraulic control unit of the kind stated at the outset so that precise switching behaviour is assured at high working pressures and with a valve of small dimensions.

This problem is solved by the features stated in the characterizing part of the main claim. The advantageous configuration of the invention is the subject-matter of the subordinate claims.

In the control unit according to the invention, the 3/2 directional control valve and the spring buffer are arranged in a valve cartridge on a common axis with the electromagnet one behind the other on an effective line of flux, with the valve cartridge inserted in the valve casing with adjustable clearance with respect to the stationary electromagnet.

The components of the 3/2 directional control valve arranged in the valve cartridge are combined with the spring buffer to form a compact assembly, whose position within the valve casing is adjustable, and which can be set, from the exterior, in the optimum switching position by means of a fine screw thread.

The spring buffer is a compact, prefabricated, precompressed component, placed in a bowl-shaped retainer, open towards the control plunger of the electromagnet, at the head end of the valve cartridge, and hence does not require subsequent adjustment. The switching force is transmitted from the control plunger of the electromagnet through the spring buffer to the switch pin of the 3/2 directional control valve. The clearance between the control plunger and the spring butter creates an idle stroke in the magnet's attraction phase, in which the switching force is developed.

Only when the switching force has reached a predetermined level is the valve knocked open by the switch pin against the hydraulic pressure and against the force of the valve spring. The precompressed spring buffer then performs like a rigid body, imparting the switching force to the switch pin of the valve in a measured manner, so that precise switching performance at high pressure is assured, even though the valve is of small dimensions.

After the valve has opened, and as the switching, force continues to increase, the magnet performs a residual stroke which is transmitted to the spring buffer and is absorbed and accumulated by its spring. When the valve switches back, the excess switching force stored in the spring buffer is utilized to cancel a remanent force generated by contact of the armature on the iron core of the magnet. The spring buffer pressure element, which has the form of a truncated cone, relocates itself to the initial position by contact with the bevelled centring faces on the sleeve insert.

A further way in which the compact construction of the control unit is used to good advantage is that the power supply for two control valves which are accommodated side by side in a single valve casing is via a printed circuit board carrying diodes and a plug socket, housed, in a space-saving fashion, in a cover which closes off the head end of the valve casing.

The invention will now be described in detail with reference to an embodiment given by way of example and illustrated in the drawing. The drawing shows an electrohydraulic control unit whose left half is illustrated in longitudinal section.

Arranged within the valve casing 1 of the control unit are two 3/2 directional control valves 2 and their electromagnets 3, with a spring buffer 4 between each electromagnet 3 and its respective 3/2 directional control valve 2. The two electromagnets 3 of the control unit are connected by a plug socket 5 to an intrinsically safe power supply which is not shown in the drawing. The socket 5 is inserted into a printed circuit board 6 provided with diodes. This printed circuit board 6 extends horizontally, straddling both magnets 3, and is housed in a shallow cover 7 which closes off the head end of the valve casing 1.

An electromagnet 3, whose shell is shown at 8, has an iron core 9, a cylindrical coil 10 and an internal armature 11. Excitation of the electromagnet 3 by application of a voltage causes the armature 11 to move axially towards the 3/2 directional control valve 2. The armature 11 is connected to a control plunger 12 which transmits the switching force of the electromagnet 3 to the spring buffer 4 and thereby to the 3/2 directional control valve 2. The control plunger 12 extends through the whole length of the electromagnet 3, and through the printed circuit board 6. The head end of the control plunger 12, which is not enclosed by the cover 7 and is covered by an elastic cap 13, can be operated manually if necessary to open the 3/2 directional control valve 2.

The components of the 3/2 directional control valve 2 are integrated in a valve cartridge 18 which is provided with a fine screw thread 19 on the cartridge shell, and is screwed into a valve bore 20 in the valve casing 1. The design of the 3/2 directional control valve 2 is basically similar to the subject-matter of DE 3206555 C2. Connections P for a high pressure line, A from a consumer unit and T for the return to tank communicate with an inner step bore (not identified by reference number in the drawing) of the valve cartridge 18 in which the valve components are arranged. Seals are provided between the connections on the cartridge shell and in the step bore; these seals are likewise not identified by reference number in the drawing.

The drawing shows the 3/2 directional control valve 2 in the closing position, in which the consumer connection A is open for the return to tank T and closed off from the high pressure connection P.

The spring buffer 4 is a prefabricated component with a compression spring 14 which is encircled by a sleeve insert 15 and is precompressed to a predetermined force by a screwed disc 16 which is screwed into the head end. The compression spring 14 acts on a pressure element 17, which, on the side towards the 3/2 directional control valve 2, has an angled face in the form of a truncated cone, and which bears against a matching bevelled centring face at the rim of the valve-side opening of the sleeve insert 15.

The spring buffer 4 is inserted in a bowl-shaped retainer 21, which is open towards the control plunger 12 of the electromagnet 3. The retainer 21 is screwed into the end of the valve cartridge 18. The switching force of the electromagnet 3 is transmitted by the control plunger 12 through the spring buffer 4 to a switch pin 22, which is guided in a guide disc 23. The switch pin 22 stands on a cylindrical stopper 24 inserted in a disc insert 25. In the opening position of the 3/2 directional control valve 2, a sealing plug 26 on the underside of the stopper 24 is brought to bear on a hoop-shaped seat seal 27 of a distributor disc 28 arranged underneath, closing the passage to the tank connection T. In the illustrated closing position of the 3/2 directional control valve 2, there is a small clearance between the stopper 24 and the seat seal 27 below. However, this short switch travel is barely visible in the drawing. Recesses (not identified by reference numbers) in the lateral surface of the stopper 24, and transverse bores 29 in the disc insert 25, are provided for the flow of hydraulic fluid. Underneath the distributor disc 28 is another stopper 30 with a sealing element 31 which is brought to bear on a likewise hoop-shaped seat seal 32 on the underside of the distributor disc 28, and, in the closing position of the 3/2 directional control valve 2, seals off the high pressure connection P from the consumer connection A. The step bore in the valve cartridge 18 is closed off from the exterior by an end stopper 33 screwed into the lower end. The end stopper 33 also serves as the abutment for a valve spring 34 acting in the closing direction.

The high pressure connection P is in communication via a radial tap hole 35 with a space formed between the end stopper 33 and the sealing element 31. Again, lateral recesses for the flow of hydraulic fluid are provided in the lateral surface of the stopper 30.

A central axial bore 36 in the distributor disc 28 leads from the seat seal 32 on the high pressure side to the seat seal 27 on the tank side, the seat seals 32 and 27 being alternately sealed in a pressuretight manner by the sealing elements 31 and 26 of the stoppers 30 and 24, respectively. Branching off from the axial bore 36 is at least one radial bore 37 communicating with an annular passageway 38 encircling the lateral face of the distributor disc 28 and communicating in turn with the consumer connection A.

In addition to the central axial bore 35, there is an off-centre parallel bore, in which a pressure pin 39 is inserted and guided in a sealed manner. The length of this pressure pin 39 is dimensioned so that the stopper 24 on the tank side is lifted off the seat seal 27 by the pressure pin 39 when the sealing element 31 in the stopper 30 is pressed against the valve seat 32 by the action of the valve spring 34 and under the pressure of the high-pressure fluid present at P.

The switch pin 22 keeps the spring buffer 4 in the retainer 21 at a distance from the bottom which preserves, beyond the switch travel, a safety clearance which eliminates the possibility of jamming. Furthermore, a clearance is provided between the control plunger 12 of the electromagnet 3 and the spring buffer 4 in order that the 3/2 directional control valve is not switched until the switching force has increased to the predetermined level.

The setting of the force stored in the precompressed spring buffer 4 to the pre determined level is carried out on assembly, that is to say outside the control unit. The 3/2 directional control valve 2, which is assembled from various components, will have length tolerances which vary from one unit to another and which affect switching behaviour. By means of the fine screw thread 19, the valve cartridge 18 can be adjusted in the valve bore 20, to vary the clearance between the valve cartridge 18 and the control plunger 12 so that the switch travel, and hence also the switching force, can be given an optimal setting between predetermined upper and lower limits.

The setting is made with a hexagon key inserted in a corresponding recess 40 at the outer end of the valve cartridge 18.

Upon switching to the opening position, the precompressed spring buffer 4 performs like a rigid body, and transmits the switching force at a precisely defined level. The switching force is transmitted directly by the spring buffer 4 to the switch pin 22, which presses the sealing element 26 of the stopper 24 onto the seat seal 27, closing the passage from the consumer connection A to the tank connection T. The pressure pin 39 transmits the switching force onwards to the stopper 30 and the sealing element 31, which is lifted off the seat seal 32. The hydraulic fluid entering from the high pressure connection P passes through the axial bore 36 and the radial bore 37 to the annular passageway 38, and thence to the consumer connection A.

Under the action of the valve spring 34 and that of the hydraulic fluid, the ³⁄₂ directional control valve 2 switches back to the initial (closing) position as soon as the switching force emanating from the electromagnet 3 drops out.

What is claimed is:

1. An electrohydraulic control unit for a hydraulic self-advancing support with a ³⁄₂ directional control valve connectable to a high-pressure line and with an electromagnet connectable to an intrinsically safe power supply to operate a stopper which in the closing position is held on a sealed seat by a valve spring and by the hydraulic fluid and is shiftable to the opening position by a control plunger of the electromagnet, a spring buffer with a pressure element which is subjected to initial pressure by spring force being interposed between the control plunger and the stopper, the ³⁄₂ directional control valve and the spring buffer being integrated in a valve cartridge inserted into the valve casing on a common axis and with adjustable clearance with respect to the electromagnet.

2. The electrohydraulic control unit according to claim 1, wherein the spring buffer is formed as a prefabricated component and is placed in a bowl-shaped retainer, open towards the control plunger of the electromagnet, at the head end of the valve cartridge.

3. The electrohydraulic control unit according to claim 2, wherein the spring buffer has a spring-loaded pressure element which is in the form of a truncated cone in the pressure direction, and a sleeve insert with matching angled centering surfaces at the rim of the valve-side opening.

4. The electrohydraulic control unit according to claim 3, wherein the spring buffer is supported on a switch pin of the ³⁄₂ directional control valve so that there is a clearance between said spring buffer and the bowl-shaped retainer of the valve cartridge, and is held so that there is a clearance between said spring buffer and the control plunger of the electromagnet.

5. The electrohydraulic control unit according to claim 4, wherein the valve cartridge can be adjusted in a valve bore of the valve casing by means of a fine screw thread on the shell of the cartridge.

6. The electrohydraulic control unit according to claim 5, wherein said valve casing includes electromagnets for two ³⁄₂ directional control valves arranged side by side in the valve casino and a horizontal printed circuit board which carries diodes and a plug socket for power supply to the electromagnets of the two ³⁄₂ directional control valves is housed in a cover which closes off the head end of the valve casing.

7. The electrohydraulic control unit according to claim 1, wherein the spring buffer is supported on a switch pin of the ³⁄₂ directional control valve so that there is a clearance between said spring buffer and a bowl-shaped retainer of the valve cartridge, and is held so that there is a clearance between said spring buffer and the control plunger of the electromagnet.

8. The electrohydraulic control unit according to claim 1, wherein the valve cartridge can be adjusted in a valve bore of the valve casing by means of a fine screw thread on the shell of the cartridge.

9. The electrohydraulic control unit according to claim 1, wherein electromagnets for said valve casing includes two ³⁄₂ directional control valves arranged side by side in the valve casing and a horizontal printed circuit board which carries diodes and a plug socket for power supply to the electromagnets of the two ³⁄₂ directional control valves is housed in a cover which closes off the head end of the valve casing.

\* \* \* \* \*